US010531060B2

(12) United States Patent
Zhuang et al.

(10) Patent No.: US 10,531,060 B2
(45) Date of Patent: Jan. 7, 2020

(54) METHOD, APPARATUS, COMPUTER-READABLE STORAGE MEDIUM, AND TERMINAL FOR CALIBRATING AUTOMATIC WHITE BALANCE

(71) Applicant: Shanghai Xiaoyi Technology Co., Ltd., Shanghai (CN)

(72) Inventors: Yudi Zhuang, Shanghai (CN); Xie Wu, Shanghai (CN); Tao Ding, Beijing (CN)

(73) Assignee: SHANGHAI XIAOYI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/041,029

(22) Filed: Jul. 20, 2018

(65) Prior Publication Data

US 2019/0082153 A1   Mar. 14, 2019

(30) Foreign Application Priority Data

Sep. 12, 2017   (CN) .......................... 2017 1 0817854

(51) Int. Cl.
*G06K 9/00*   (2006.01)
*H04N 9/73*   (2006.01)
(Continued)

(52) U.S. Cl.
CPC .............. *H04N 9/735* (2013.01); *H04N 9/77* (2013.01); *H04N 17/002* (2013.01)

(58) Field of Classification Search
CPC .......... H04N 13/00; H04N 17/00; H04N 9/31; H04N 9/735; H04N 9/77; H04N 17/002;
(Continued)

(56) References Cited

U.S. PATENT DOCUMENTS

| 7,102,648 B1 * | 9/2006 | Holub ....................... G06F 3/14 |
| | | 345/589 |
| 7,912,279 B2 * | 3/2011 | Hsu ....................... H04N 1/6027 |
| | | 358/516 |

(Continued)

FOREIGN PATENT DOCUMENTS

CN          105376539 A       3/2016

OTHER PUBLICATIONS

Extended European Search Report dated Jan. 21, 2019, issued in counterpart European Patent Application No. 18193875.4.

*Primary Examiner* — Trang U Tran
(74) *Attorney, Agent, or Firm* — Cantor Colburn LLP (57) ABSTRACT

A method, apparatus, computer-readable storage medium, and terminal for calibrating automatic white balance is provided including: obtaining a first white point acquired by a device under calibration capturing a neutral color under a calibration light source, and obtaining a second white point acquired by a predetermined golden set capturing a neutral color under the calibration light source; if either or both a first difference value between a first red deviation value and a second red deviation value is greater than a first predetermined threshold value and a second difference value between a first blue deviation value and a second blue deviation value is greater than a second predetermined threshold value, performing one or more of adjusting the second red deviation value so that the first difference value becomes smaller and adjusting the second blue deviation value so that the second difference value becomes smaller; and calibrating the device under calibration by using one or more of the adjusted second red deviation value and the adjusted second blue deviation value as a first golden value and a second golden value, respectively.

14 Claims, 4 Drawing Sheets

(51) Int. Cl.
*H04N 17/00* (2006.01)
*H04N 9/77* (2006.01)

(58) Field of Classification Search
CPC .......... H04N 9/68; H04N 9/3161; G06K 9/00; G06K 9/34
USPC .................. 382/167, 154, 162; 348/647, 187
See application file for complete search history.

(56) References Cited

U.S. PATENT DOCUMENTS

| | | |
|---|---|---|
| 9,509,902 B1 | 11/2016 | Barron et al. |
| 9,942,531 B2 * | 4/2018 | Sourani ................ H04N 9/3194 |
| 2012/0189191 A1 | 7/2012 | Bai et al. |
| 2016/0200553 A1 | 7/2016 | Sorensen et al. |
| 2017/0302915 A1 * | 10/2017 | Kang .................. H04N 9/3182 |

* cited by examiner

ND, APPARATUS,
COMPUTER-READABLE STORAGE
MEDIUM, AND TERMINAL FOR
CALIBRATING AUTOMATIC WHITE
BALANCE

CROSS-REFERENCE TO RELATED APPLICATION

This application is based upon and claims priority from Chinese Patent Application No. 201710817854.2, filed on Sep. 12, 2017, the disclosure of which is expressly incorporated herein by reference in its entirety.

TECHNICAL FIELD

The present disclosure relates to the field of image processing technology and more particularly, to a method, apparatus, computer-readable storage medium, and terminal for calibrating automatic white balance.

BACKGROUND

In order to eliminate differences, which are caused by manufacturing errors, between red-component-to-green-component ratios (R/G) of lens modules and between blue-component-to-green-component ratios (B/G) of lens modules, and thus make correct color temperature estimations, a method for calibrating automatic white balance (AWB) is usually introduced to lens module production lines.

In currently available technology, the method usually employed for calibrating AWB includes the following steps: 1) obtaining a sample distribution chart for red component values and blue component values from mass produced (for example, 50 to 200 units) devices under designated calibration light sources (a light source with a high color temperature and a light source with a low color temperature are usually selected); 2) calculating to obtain average values of the R/G values and the B/G values from a sample distribution chart, the average values being used as golden values, and a device that is closest to the golden values being selected to be a golden set; 3) using the golden set to determine a white area for AWB and a color temperature estimation algorithm; 4) calibrating AWB on a device under test, from which the following ratios need to be acquired: the red-component-to-green-component ratio R_set and the blue-component-to-green-component ratio B_set of the device under test under standard light sources with two different color temperatures, and the red-component-to-green-component ratio R_golden and the blue-component-to-green-component ratio B_golden of the golden set under the two different color temperatures; and 5) calculating the gains, i.e., R_gain=R_golden/R_set and B_gain=B_golden/B_set, of the algorithm for calibrating AWB under the two different color temperatures. Devices whose errors are small can essentially be calibrated to adapt to the white area of the golden set by means of the aforementioned method for calibrating AWB.

However, for devices whose errors are small, such as devices whose errors are less than 10%, relatively accurate calibration can be achieved using AWB calibration methods of currently available technology; for devices whose errors are larger, such as devices whose errors are greater than 15%, or even 20%, using the AWB calibration methods of currently available technology may result in calibration gains being too large or too small, making the differences between the white points of the calibrated device and the white points of the golden set too large. This results in poor calibration outcomes, leading to subsequent inaccuracy in color temperature estimations by the device, and thus lowering imaging quality.

SUMMARY

In accordance with an embodiment of the present disclosure, there is provided a method for calibrating AWB including: obtaining a first white point acquired by a device under calibration capturing a neutral color under a calibration light source, and obtaining a second white point acquired by a predetermined golden set capturing a neutral color under the calibration light source, the first white point including a first red deviation value and a first blue deviation value, and the second white point including a second red deviation value and a second blue deviation value. In the method, the first red deviation value is a ratio of a red value to a green value acquired by the device under calibration capturing a neutral color, the first blue deviation value is a ratio of a blue value to a green value acquired by the device under calibration capturing a neutral color, the second red deviation value is a ratio of a red value to a green value acquired by the predetermined golden set capturing a neutral color, and the second blue deviation value is a ratio of a blue value to a green value acquired by the predetermined golden set capturing a neutral color. If either or both a first difference value between the first red deviation value and second red deviation value is greater than a first predetermined threshold value and a second difference value between the first blue deviation value and second blue deviation value is greater than a second predetermined threshold value, one or more of adjusting the second red deviation value so that the first difference value becomes smaller and adjusting said second blue deviation value so that the second difference value becomes smaller is performed. The device under calibration is calibrated using one or more of the adjusted second red deviation value and the adjusted second blue deviation value as a first golden value and a second golden value, respectively.

In accordance with another embodiment of the disclosure, there is provided an apparatus for calibrating AWB, including a white point obtaining module to obtain a first white point acquired by a device under calibration capturing a neutral color under a calibration light source and obtain a second white point acquired by a predetermined golden set capturing a neutral color under the calibration light source. The first white point includes a first red deviation value and a first blue deviation value, and the second white point includes a second red deviation value and a second blue deviation value. The first red deviation value is a ratio of a red value to a green value acquired by the device under calibration capturing a neutral color and the first blue deviation value is a ratio of a blue value to a green value acquired by the device under calibration capturing a neutral color. The second red deviation value is a ratio of a red value to a green value acquired by the predetermined golden set capturing a neutral color, and the second blue deviation value is a ratio of a blue value to a green value acquired by the predetermined golden set capturing a neutral color. The apparatus also includes an adjusting module adapted for, when either or both a first difference value between a first red deviation value and a second red deviation value is greater than a first predetermined threshold value and a second difference value between a first blue deviation value and a second blue deviation value is greater than a second predetermined threshold value, performing one or more of adjusting the second red deviation value so that the first difference value becomes smaller and adjusting the second blue deviation value so that the second difference value becomes smaller. The apparatus further includes a calibrating module adapted for calibrating the device under calibration using one or more of the adjusted second red deviation value and the adjusted second blue deviation value as a first golden value and a second golden value, respectively.

Further in accordance with the disclosure, there is provided a computer-readable storage medium in which computer instructions are stored, and the steps in the method for calibrating AWB as described above are executed when the computer instructions are executed.

Additionally, in accordance with the present disclosure, there is provided a terminal, which includes a storage device and a processor. The storage device stores computer instructions that may be executed on the processor, and the steps in the aforementioned method for calibrating AWB are executed when the processor executes the computer instructions.

DETAILED DESCRIPTION

As described in the background art, for devices whose errors are small, such as devices whose errors are less than 10%, relatively accurate calibration can be achieved using AWB calibration methods of currently available technology. For devices whose errors are larger, such as devices whose errors are greater than 15%, or even 20%, using the AWB calibration methods of currently available technology may result in calibration gains being too large or too small, making the differences between the white points of the calibrated device and the white points of the golden set too large. This results in poor calibration outcomes, leading to subsequent inaccuracy in color temperature estimations by the device, and thus lowering imaging quality.

The inventors of the present disclosure have discovered through research that currently available methods for calibrating AWB lose their effectiveness at adjusting different devices to make their AWB performance consistent, causing the AWB performance of different devices to be completely different from the golden set, and thus resulting in AWB failure. In the event of AWB failure, some solutions will increase the white area of the color temperature estimation so that the white point of a calibrated device falls within the white area of the color temperature estimation. However, increasing the white area will cause non-neutral colors under other correct color temperatures to be misidentified as white points, thus resulting in an offset in the estimated value of an AWB algorithm under correct color temperatures.

In the technical solution provided herein, when the error between a device under calibration and a golden set is larger, i.e., when a first difference value between a first red deviation value and a second red deviation value is greater than a first predetermined threshold value, and/or a second difference value between a first blue deviation value and a second blue deviation value is greater than a second predetermined threshold value, the second red deviation value and/or the second blue deviation value of the golden set are/is adjusted, thereby reducing the difference after the adjustment between a first golden value and the first red deviation value, and/or the difference after the adjustment between a second golden value and the first blue deviation value. Hence, calibration gains may be reduced during calibration to ensure that the device under calibration is calibrated more accurately when under calibration light sources of all color temperatures, thus achieving the accuracy of the method for calibrating AWB. Moreover, compared to currently available technology that can only perform calibrations on devices whose errors are smaller, the technical solution provided herein can perform calibrations on devices whose errors are larger and increase the scope of application for the method for calibrating AWB.

In order to make the aforementioned purpose, characteristics, and advantages of the present disclosure more evident and easier to understand, detailed descriptions of embodiments of the present disclosure, with reference to the attached drawings, are provided.

Figure 1:
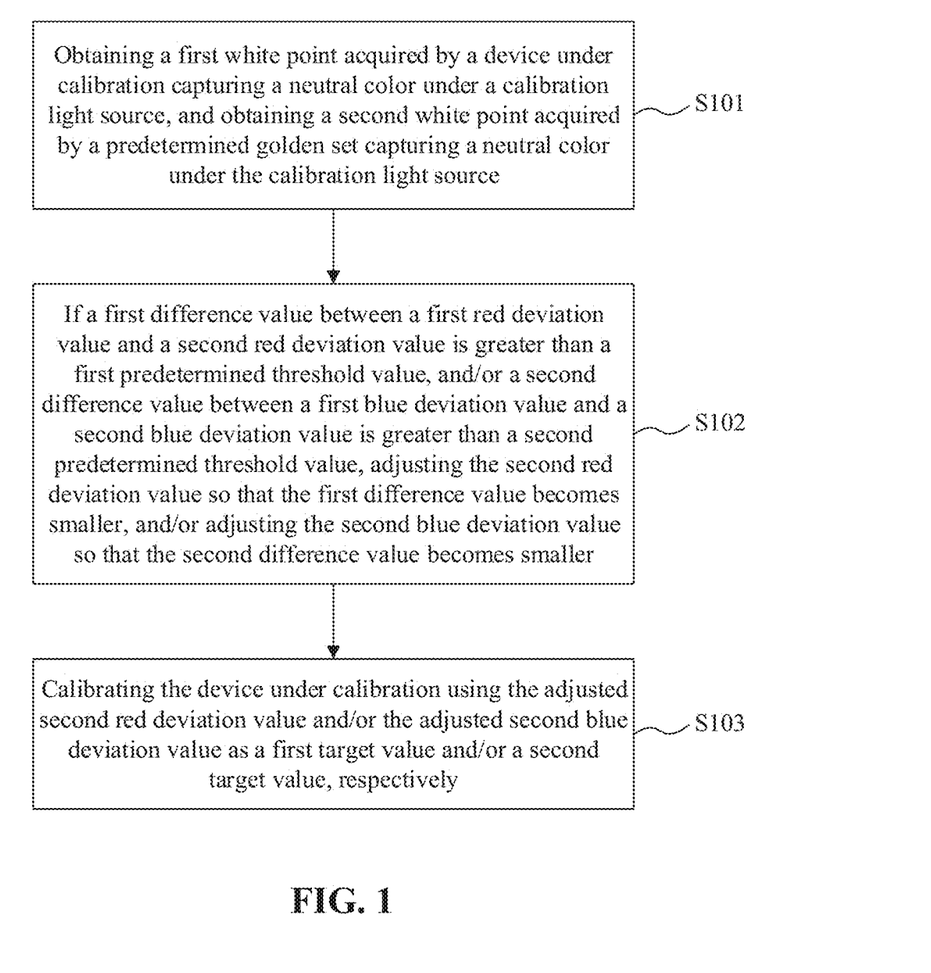
FIG. 1 is a flowchart illustrating a method for calibrating AWB in an embodiment of the present disclosure.

FIG. 1 is a flowchart illustrating a method for calibrating AWB in an embodiment of the present disclosure.

The method for calibrating AWB illustrated in FIG. 1 includes the following steps:

Step S101 includes obtaining a first white point acquired by a device under calibration capturing a neutral color under a calibration light source, and obtaining a second white point acquired by a predetermined golden set capturing a neutral color under the calibration light source. In some embodiments, a different calibration source may be used to obtain the second white point. For example, a different calibration source for obtaining the second white point may be set up to have its optical characteristics such as color temperatures and illuminance consistent with the calibration source for obtaining the first white point. In some embodiments, different light boards of a calibration light source may be used to obtain white points, such as the first and second white points.

Step S102 includes, if a first difference value between a first red deviation value and a second red deviation value is greater than a first predetermined threshold value, and/or a second difference value between a first blue deviation value and a second blue deviation value is greater than a second predetermined threshold value, adjusting the second red deviation value so that the first difference value becomes smaller, and/or adjusting the second blue deviation value so that the second difference value becomes smaller.

Step S103 includes calibrating the device under calibration using the adjusted second red deviation value and/or the adjusted second blue deviation value as a first golden value and/or a second golden value, respectively.

In an embodiment of Step S101, the number of calibration light sources may be at least two, and the color temperatures of the calibration light sources may be preselected. For example, when two calibration light sources are used, a light source with a higher color temperature (e.g., 4,850K) and a light source with a lower color temperature (e.g., 2,850K) may be selected, and the specific values of the higher color temperature and the lower color temperature may be configured according to different application environments. A person of ordinary skill in the art should now understand that a predetermined golden set may be a preselected lens module, and a quantity of the predetermined golden sets may be configured according to different application environments, which is not limited by the embodiments disclosed herein.

The first white point may be acquired by using the device under calibration to capture (i.e., taking a shot) a neutral color under a calibration light source, and the second white point may be acquired by using the predetermined golden set to capture a neutral color under the calibration light source. The first white point includes a first red deviation value R1/G1 and a first blue deviation value B1/G1, and the second white point includes a second red deviation value R2/G2 and a second blue deviation value B2/G2. The first red deviation value R1/G1 is a ratio of a red value R1 and a green value G1 that are acquired by the device under calibration capturing a neutral color, and the first blue deviation value B1/G1 is a ratio of a blue value B1 and a green value G1 that are acquired by the device under calibration capturing a neutral color. The second red deviation value R2/G2 is a ratio of a red value R2 and a green value G2 that are acquired by the predetermined golden set capturing a neutral color, the second blue deviation value B2/G2 is the ratio of a blue value B2 and a green value G2 that are acquired by the predetermined golden set capturing a neutral color.

It should be understood that the number of the first white point and the number of the second white point may both be more than one.

In an embodiment of Step S102, the first difference value and/or the second difference value may indicate the error of the device under calibration. If the first difference value is greater than the first predetermined threshold value, or the second difference value is greater than the second predetermined threshold value, or the first difference value is greater than the first predetermined threshold value and the second difference value is greater than the second predetermined threshold value, a larger error of the device under calibration is indicated. Under these circumstances, the second red deviation value may be adjusted, or the second blue deviation value may be adjusted, or the second red deviation value and the second blue deviation value may both be adjusted. After the adjustment is completed, the first difference value becomes smaller, or the second difference value becomes smaller, or the first difference value and the second difference value both become smaller. In other words, the difference between the first white point of the device under calibration and the second white point of the predetermined golden set becomes smaller. Specifically, the difference between the first white point and the second white point may be determined based on the first difference value and the second difference value.

In specific applications, the value of the first predetermined threshold value and the value of the second predetermined threshold value may be the same or may be different. The numerical value of the first predetermined threshold value or the second predetermined threshold value may be 10%, 15%, or 20%, or may be any other implementable numerical value, which is not limited by the disclosed embodiments herein.

In an embodiment of Step S103, the adjusted second red deviation value and/or the adjusted second blue deviation value may be taken to be the first golden value and/or the second golden value, respectively. After completing the calibration of the device under calibration, under the calibration light source, the first red deviation value and the first golden value are consistent, and/or the first blue deviation value and the second golden value are consistent. Since the first difference value becomes smaller and/or the second difference value becomes smaller after Step S102 is performed, a calibration gain from the calibration process becomes smaller, thus improving the accuracy of the calibration. Furthermore, the calibration gain may be a distance by which the first red deviation value needs to be shifted to cause the first red deviation value and the first golden value to be consistent, and/or a distance by which the first blue deviation value needs to be shifted to cause the first blue deviation value and the second golden value to be consistent.

It should be understood that the first golden value and the second golden value are still in the white area of the predetermined golden set, i.e., the white area still accommodates the first golden value and the second golden value. Consequently, after a calibration is performed on the device under calibration using the first golden value and/or the second golden value, the performance of the first white point of the device under calibration and the performance of the second white point of the predetermined golden set can be consistent, thus achieving the accuracy of the calibration.

In an embodiment, when the error between a device under calibration and a golden set is larger, i.e., when the first difference value between the first red deviation value and the second red deviation value is greater than the first predetermined threshold value, and/or the second difference value between the first blue deviation value and the second blue deviation value is greater than the second predetermined threshold value, the second red deviation value and/or the second blue deviation value of the golden set are/is adjusted, thereby reducing the difference after the adjustment between the first golden value and the first red deviation value, and/or the difference after the adjustment between the second golden value and the first blue deviation value, and the calibration gains may be reduced during calibration. By not altering the size of the white area, more accurate calibration of the device under calibration under light sources of all color temperatures is ensured, thus achieving the accuracy of the method for calibrating AWB. Moreover, compared to currently available technology that can only perform calibration on devices with smaller errors, calibration can be performed on devices with larger errors to increase the scope of application for the method for calibrating AWB in accordance with the disclosure herein.

Further, for circumstances in which different white areas cannot be configured for different devices, the same white area can be adapted to lens modules having larger errors in accordance with the disclosure herein.

In some embodiments, Step S103 may include calculating a ratio of the first golden value to the first red deviation value as a first calibration gain, and using the first calibration gain to shift the first white point so that, on a dimension of red deviation values, a location of the first white point in the predetermined white area and a location of the second white point in the predetermined area are consistent.

Step S103 may include, additionally or alternatively, calculating a ratio of the second golden value to the first blue deviation value as a second calibration gain, and using the second calibration gain to shift the first white point so that, on a dimension of blue deviation values, a location of the first white point in the predetermined white area and a location of the second white point in the predetermined area are consistent.

In the present embodiment, the process for calibrating the device under calibration may be to adapt its white point to the predetermined white area, i.e., to cause the location of the first white point of the device under calibration in the predetermined white area and the location of the second white point of the predetermined golden set in the predetermined white area to be consistent.

Figure 2:
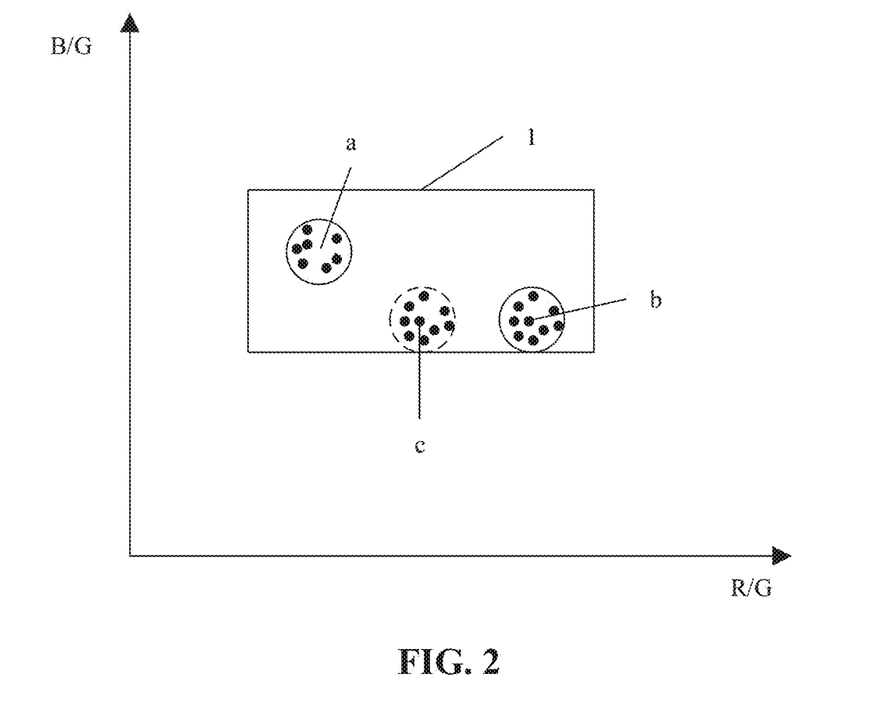
FIG. 2 is a diagram illustrating a specific application scenario for calibrating AWB in an embodiment of the present disclosure.

Referring to FIG. 2, a predetermined white area 1 contains all white points acquired by the predetermined golden set capturing a neutral color under different color temperatures. The predetermined white area 1 has two dimensions, i.e., a red deviation value R/G dimension and a blue deviation value B/G dimension. A first white point "a" and a second white point "b" are defined by two dimensions, i.e., the dimension of red deviation values and the dimension of blue deviation values.

In one variation of the present embodiment, if only the second red deviation value is adjusted, the ratio of the first golden value to the first red deviation value is calculated to be the first calibration gain. The first calibration gain may indicate a distance by which the first white point "a" is shifted along the dimension of red deviation values, and a direction in which the first white point "a" is shifted is a direction from the first red deviation value to the first golden value. A person of ordinary skill in the art should understand that a ratio of the second blue deviation value of the golden set to the first blue deviation value of the device under calibration may also be calculated, and, along the dimension of blue deviation values, the first white point "a" is shifted using the ratio. After the shift is completed, on the two dimensions, i.e., the dimension of red deviation values and the dimension of blue deviation values, the location of the first white point "a" in the predetermined white area 1 and the location of the second white point in the predetermined white area 1 are consistent.

In another variation of the present embodiment, if only the second blue deviation value is adjusted, then the ratio of the second golden value to the first blue deviation value is calculated to be the second calibration gain. The second calibration gain may indicate a distance by which the first white point "a" is shifted along the dimension of blue deviation values, and a direction in which the first white point "a" is shifted is a direction from the first blue deviation value to the second golden value. A person of ordinary skill in the art should now understand that a ratio of the second red deviation value of the golden set to the first red deviation value of the device under calibration may also be calculated. Along the dimension of red deviation values, the first white point "a" is shifted using the ratio. After the shift is completed, on the two dimensions, i.e., the dimension of red deviation values and the dimension of blue deviation values, the location of the first white point "a" in the predetermined white area 1 and the location of the second white point "b" in the predetermined white area 1 are consistent.

In yet another variation of the present embodiment, if the second red deviation value and the second blue deviation value are adjusted, the first white point "a" may be shifted using the first calibration gain and the second calibration gain so that, on the two dimensions, i.e., the dimension of red deviation values and the dimension of blue deviation values, the location of the first white point "a" in the predetermined white area 1 and the location of the second white point "b" in the predetermined white area 1 are consistent.

Preferably, the method for calibrating AWB illustrated in FIG. 1 may further include, under color temperatures other than the color temperatures of the calibration light sources, acquiring corresponding calibration gains by performing iterative interpolation using the first calibration gain and/or the second calibration gain, respectively, and shifting the first white point "a" along the dimension of red deviation values and/or the dimension of blue deviation values.

In the present embodiment, because the color temperatures of the calibration light sources are limited, after at least two calibration gains for the device under calibration are calculated and acquired under at least two calibration light sources, calibration gains corresponding to other color temperatures may be acquired by performing iterative interpolation using the at least two calibration gains. Specifically, the method of interpolation may be linear interpolation, such as bilinear interpolation, trilinear interpolation, etc.

Specifically, calibration gains on the dimension of red deviation values corresponding to the other color temperatures may be acquired by performing iterative interpolation on the first calibration gain. Calibration gains on the dimension of blue deviation values corresponding to the other color temperatures may be acquired by performing iterative interpolation on the second calibration gain. If no adjustment is performed on the second red deviation value or the second blue deviation value, calibration gains corresponding to other color temperatures may be acquired by performing iterative interpolation using currently available technology.

In some embodiments, Step S102 may include the following steps:

If the second red deviation value is greater than the first red deviation value, a red deviation value that is numerically less than the second red deviation value is selected within the predetermined white area to be the adjusted second red deviation value.

If the second red deviation value is less than the first red deviation value, a red deviation value that is numerically greater than the second red deviation value is selected within the predetermined white area to be the adjusted second red deviation value.

If the second blue deviation value is greater than the first blue deviation value, a blue deviation value that is numerically less than the second blue deviation value is selected within the predetermined white area to be the adjusted second blue deviation value.

If the second blue deviation value is less than the first blue deviation value, a blue deviation value that is numerically greater than the second blue deviation value is selected within the predetermined white area to be the adjusted second blue deviation value.

In the present embodiment, the adjusted second red deviation value may be determined according to the greater-lesser relationship between the first red deviation value and the second red deviation value, and the adjusted second blue deviation value may be determined according to the greater-lesser relationship between the first blue deviation value and the second blue deviation value.

In one variation of the present embodiment, with reference to FIG. 2, if, on the dimension of red deviation values R/G, the second red deviation value of the second white point "b" is greater than the first red deviation value of the first white point "a," and the first difference value is greater than the first predetermined threshold value, a red deviation value that is numerically less than the second red deviation value is selected to be the adjusted second red deviation value, i.e., the white point "c" is the first golden value, making the first difference value become smaller. In other words, the calibration gain during calibration also becomes smaller, thereby ensuring that a better calibration result can be obtained by the device under calibration under each color temperature.

Similarly, if the second red deviation value is less than the first red deviation value, and the first difference value is greater than the first predetermined threshold value, a red deviation value that is numerically greater than the second red deviation value is selected within the predetermined white area 1 to be the adjusted second red deviation value, making the first difference value become smaller. For example, if the first red deviation value R1/G1 of the first white point "a" of the device under calibration is larger, i.e., much larger than the second red deviation value R2/G2 of the predetermined golden set, the second red deviation value R2/G2 may be increased correspondingly to decrease the distance between the first white point "a" and the second white point "b."

In the present embodiment, if the second blue deviation value is greater than the first blue deviation value, and the second difference value is greater than the second predetermined threshold value, a blue deviation value that is numerically less than the second blue deviation value is selected within the predetermined white area 1 to be the adjusted second blue deviation value, making the second difference value become smaller. For example, if the first blue deviation value B1/G1 of the first white point "a" of the device under calibration is smaller, i.e., much smaller than the second blue deviation value B2/G2 of the predetermined golden set, the second blue deviation value B2/G2 may be decreased correspondingly to decrease the distance between the first white point "a" and the second white point "b."

In the present embodiment, if the second blue deviation value is less than the first blue deviation value, and the second difference value is greater than the second predetermined threshold value, a blue deviation value that is numerically greater than the second blue deviation value is selected within the predetermined white area 1 to be the adjusted second blue deviation value, making the second difference value become smaller. For example, if the first blue deviation value B1/G1 of the first white point "a" of the device under calibration is larger, i.e., much larger than the second blue deviation value B2/G2 of the predetermined golden set, the second blue deviation value B2/G2 may be increased correspondingly to decrease the distance between the first white point "a" and the second white point "b."

In one specific application, under a cool white fluorescent (CWF) light source with a color temperature of 4,150K, the white point of the device under calibration already exceeds the predetermined white area. Therefore, after the correction using the calibration gain obtained from repeated iterations, the white point will fall outside the predetermined white area, causing the device under calibration using an AWB algorithm to be unable to correctly identify a neutral color, thus resulting in a color cast. In an embodiment, reducing the calibration gain on the dimension of red deviation values may prevent the white point of the device from deviating from the white area after undergoing calibration. In other words, in order to achieve this purpose, the golden value under a calibration light source with a color temperature of 2,850K or 4,850K may be adjusted. Under a calibration light source with a color temperature of 2,850K, the uncalibrated first white point of the device under calibration is located within the predetermined white area, and the second red deviation value is greater than the first red deviation value. Consequently, under the calibration light source with a color temperature of 2,850K, the accuracy of the calibration is not affected even if there is no calibration gain. Therefore, the first red deviation value of the device under calibration may be selected to be the first golden value. The first calibration gain on the dimension of red deviation values calculated after the adjustment is much less than the gain value calculated and acquired under the original golden value.

Therefore, after undergoing repeated iterations of iterative interpolations, under a cool white fluorescent (CWF) light source with a color temperature of 4,150K, the calibration gain on the dimension of red deviation values will also be reduced, thus ensuring the accuracy of the calibration. Thus, the performance of devices under calibration having different error sizes will be consistent after the AWB calibration is performed.

Referring to FIG. 1, in some embodiments, Step S102 may include the following steps: when the color temperature of the calibration light source is lower than the predetermined color temperature threshold value, adjusting the second red deviation value so that the first difference value becomes smaller, and/or adjusting the second blue deviation value so that the second difference value becomes smaller.

In an embodiment of the present disclosure, for devices whose errors are larger, for example, a device whose first difference value between the first red deviation value and the second red deviation value is greater than the first predetermined threshold value and/or whose the second difference value between the first blue deviation value and the second blue deviation value is greater than the second predetermined threshold value, the calibration gain acquired by interpolation will be too large and the calibrated white point will fall outside the white area under a lower color temperature, i.e., when the color temperature of the calibration light source is lower than the predetermined color temperature threshold value. Therefore, in order to decrease the calibration gain acquired by interpolation, the calibration gain under a lower color temperature may be decreased. In other words, the distance between the first white point of the device under calibration whose error is larger and the second white point of the predetermined golden set may be decreased under a lower color temperature.

For example, if the first red deviation value R1/G1 of the first white point of the device under calibration is larger, i.e., much larger than the second red deviation value R2/G2 of the predetermined golden set, the second red deviation value R2/G2 may be increased correspondingly to decrease the distance between the first white point and the second white point.

The second red deviation value and/or the second blue deviation value of the golden set are/is adjusted only under a calibration light source with a lower color temperature, i.e., when the color temperature of the calibration light source is lower than the predetermined color temperature threshold value, and the range of the predetermined white area under a calibration light source with a lower color temperature is larger. Therefore, more accurate AWB calibration of the device under calibration may be achieved without having to increase the complexity of the calibration.

Furthermore, since the range of the predetermined white area is larger under a calibration light source with a lower color temperature, the adjusted second red deviation value and/or the second blue deviation value are/is still located in the center of the predetermined white area, i.e., located in a circular area whose center is the center point and whose radius is the predetermined threshold value, thus further ensuring more accurate AWB calibration of the device under calibration.

In some embodiments, the first golden value falls in a middle range of the coverage on the dimension of red deviation values of the predetermined white area, and the second golden value falls in a middle range of the coverage on the dimension of blue deviation values of the predetermined white area.

In an embodiment of the present disclosure, the predetermined white area is formed by performing quantification using the golden set in advance. By configuring the first golden value so that it falls in a middle range of the coverage on the dimension of red deviation values of the predetermined white area, and by configuring the second golden value so that it falls in a middle range of the coverage on the dimension of blue deviation values of the predetermined white area, the calibration accuracy of the device under calibration can be ensured under calibration light sources for all color temperatures.

Figure 3:
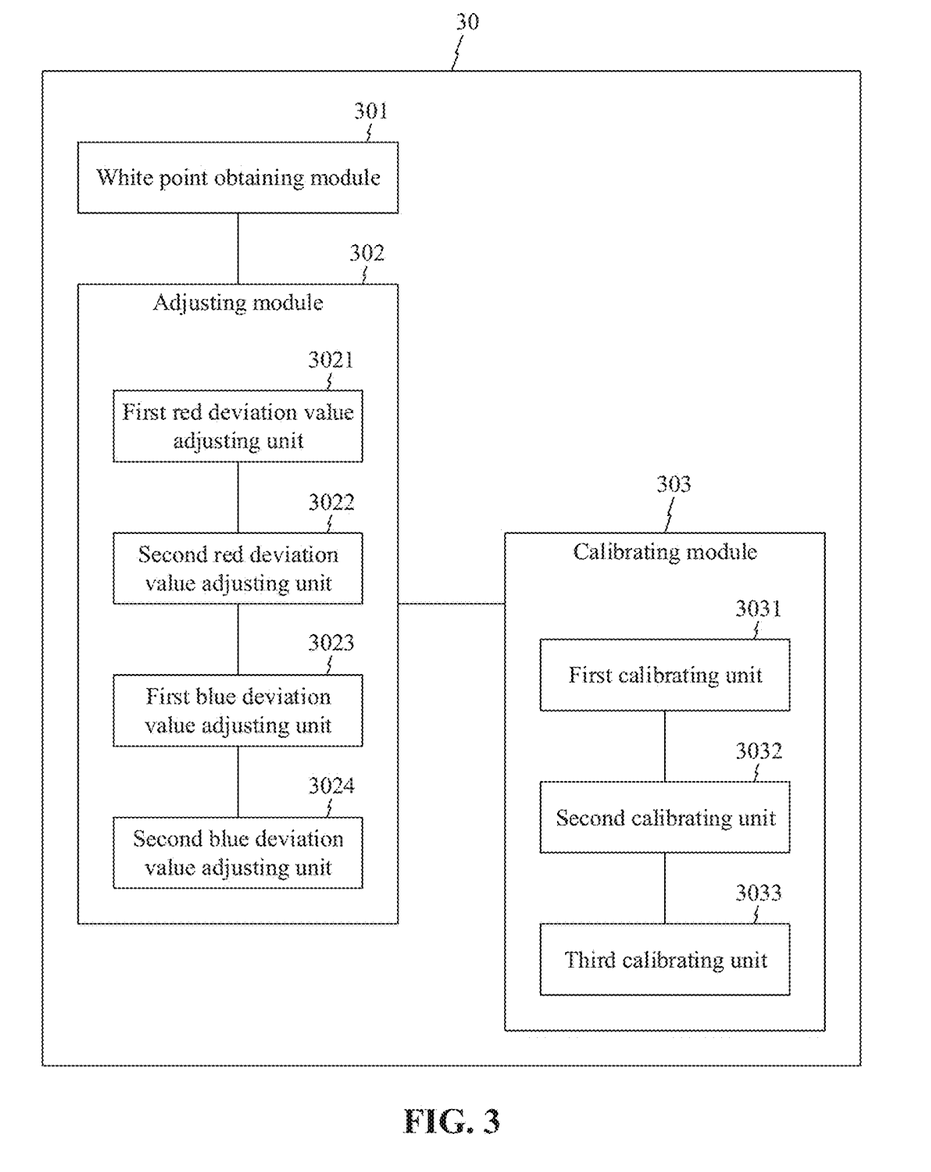
FIG. 3 is a structural schematic diagram illustrating an apparatus for calibrating AWB in an embodiment of the present disclosure.

FIG. 3 is a structural schematic diagram illustrating an apparatus 30 for calibrating AWB in an embodiment of the present disclosure.

The AWB calibrating apparatus 30 illustrated in FIG. 3 includes a white point obtaining module 301, an adjusting module 302, and a calibrating module 303.

The white point obtaining module 301 is adapted for obtaining a first white point acquired by a device under calibration capturing a neutral color under a calibration light source, and obtaining a second white point acquired by a predetermined golden set capturing a neutral color under a calibration light source.

The adjusting module 302 is adapted for, when a first difference value between the first red deviation value and second red deviation value is greater than a first predetermined threshold value, and/or a second difference value between the first blue deviation value and second blue deviation value is greater than a second predetermined threshold value, adjusting the second red deviation value so that the first difference value becomes smaller, and/or adjusting the second blue deviation value so that the second difference value becomes smaller.

The calibrating module 303 is adapted for calibrating the device under calibration by using the adjusted second red deviation value and/or the adjusted second blue deviation value as a first golden value and/or a second golden value, respectively.

In the present embodiment, the first white point includes the first red deviation value and the first blue deviation value, and the second white point includes the second red deviation value and the second blue deviation value. The first red deviation value is a ratio of a red value and a green value that are acquired by the device under calibration capturing a neutral color, and the first blue deviation value is a ratio of a blue value and a green value that are acquired by the device under calibration capturing a neutral color. The second red deviation value is a ratio of a red value and a green value that are acquired by the predetermined golden set capturing a neutral color, and the second blue deviation value is a ratio of a blue value and a green value that are acquired by the predetermined golden set capturing a neutral color.

In one embodiment of the present invention, when the error between a device under calibration and a golden set is larger, i.e., when the first difference value between the first red deviation value and the second red deviation value is greater than the first predetermined threshold value, and/or the second difference value between the first blue deviation value and the second blue deviation value is greater than the second predetermined threshold value, the second red deviation value and/or the second blue deviation value of the golden set are/is adjusted, thereby reducing the difference after the adjustment between the first golden value and the first red deviation value, and/or the difference after the adjustment between the second golden value and the first blue deviation value. Thus, calibration gains may be reduced during calibration to ensure that the device under calibration is calibrated more accurately when under light sources of all color temperatures, thus achieving the accuracy of the method for calibrating AWB. Moreover, compared to currently available technology that can only perform calibrations on devices with smaller errors, embodiments of the present disclosure can perform calibration on devices with larger errors and increase the scope of application for the method for calibrating AWB.

In some embodiments, the calibrating module 303 includes a first calibrating unit 3031, which is adapted for calculating the ratio of the first golden value to the first red deviation value as a first calibration gain, and using the first calibration gain to shift the first white point so that, on the dimension of red deviation values, the location of the first white point in the predetermined white area and the location of the second white point in the predetermined area are consistent. The predetermined white area contains all white points acquired by the predetermined golden set capturing a neutral color under different color temperatures, and the predetermined white area has two dimensions, i.e., the dimension of red deviation values and the dimension of blue deviation values. The first white point and the second white point are defined by the two dimensions, i.e., the dimension of red deviation values and the dimension of blue deviation values.

The calibrating module 303 may further include a second calibrating unit 3032, which is adapted for calculating the ratio of the second golden value to the first blue deviation value as a second calibration gain, and using the second calibration gain to shift the first white point so that, on the dimension of blue deviation values, the location of the first white point in the predetermined white area and the location of the second white point in the predetermined area are consistent.

In some embodiments, the calibrating module 303 further includes a third calibrating unit 3033, which is adapted for, under color temperatures other than the color temperatures of the calibration light sources, acquiring corresponding calibration gains by performing iterative interpolation using the first calibration gain and/or the second calibration gain, respectively, and shifting the first white point along the dimension of red deviation values and/or the dimension of blue deviation values.

In some embodiments, the adjusting module 302 includes a first red deviation value adjusting unit 3021, a second red deviation value adjusting unit 3022, a first blue deviation value adjusting unit 3023, and a second blue deviation value adjusting unit 3024. The first red deviation value adjusting unit 3021 is adapted for, when the second red deviation value is greater than the first red deviation value, selecting within the predetermined white area a red deviation value that is numerically less than the second red deviation value to be the adjusted second red deviation value. The second red deviation value adjusting unit 3022 is adapted for, when the second red deviation value is less than the first red deviation value, selecting within the predetermined white area a red deviation value that is numerically greater than the second red deviation value to be the adjusted second red deviation value. The first blue deviation value adjusting unit 3023 is adapted for, when the second blue deviation value is greater than the first blue deviation value, selecting within the predetermined white area a blue deviation value that is numerically less than the second blue deviation value to be the adjusted second blue deviation value. The second blue deviation value adjusting unit 3024 is adapted for, when the second blue deviation value is less than the first blue deviation value, selecting within the predetermined white area a blue deviation value that is numerically greater than the second blue deviation value to be the adjusted second blue deviation value.

Preferably, the adjusting module 302 adjusts the second red deviation value so that the first difference value becomes smaller, and/or adjusts the second blue deviation value so that the second difference value becomes smaller, when the color temperature of the calibration light source is lower than a predetermined color temperature threshold value.

In some embodiments, the first golden value falls in a middle range of the coverage on the dimension of red deviation values of the predetermined white area, and the second golden value falls in a middle range of the coverage on the dimension of blue deviation values of the predetermined white area.

Please refer to the description herein related to FIGS. 1 and 2 for more information on the principles and manner of operating the AWB calibrating apparatus 30. No redundant description is detailed here.

An embodiment of the present disclosure further includes a computer-readable storage medium in which computer instructions are stored, the steps in the method for calibrating AWB illustrated in FIG. 1 being executed when the computer instructions are executed. The storage medium may include a ROM, a RAM, a magnetic disk, an optical disk, or the like.

Figure 4:
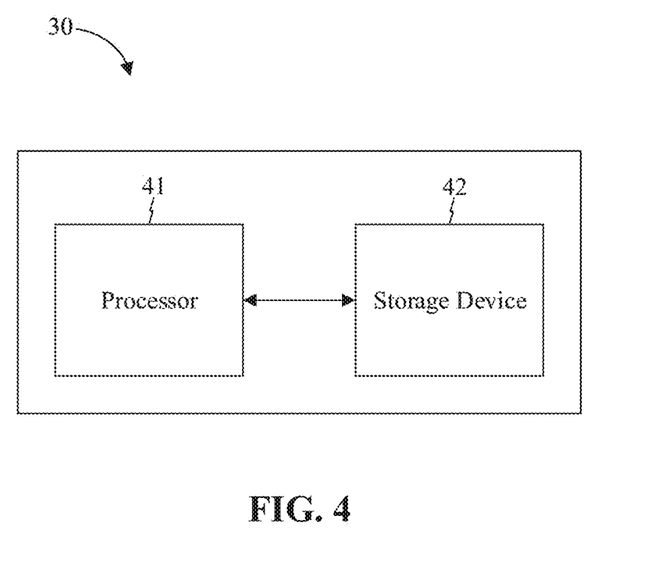
FIG. 4 is a structural schematic diagram illustrating an apparatus for calibrating AWB in an embodiment of the present disclosure.

An embodiment of the present disclosure further includes a terminal, such as AWB calibrating 30, which includes a storage device 42 and a processor 41 as shown in FIG. 4. The storage device 42 stores computer instructions that can be executed on the processor 41. The steps in the method for calibrating AWB illustrated in FIG. 1 are executed when the processor 41 executes the computer instructions. The terminal includes, but is not limited to, a cell phone, a computer, a tablet, or another terminal device.

Notwithstanding the foregoing disclosure, the present invention is not limited by the disclosure. Any person of ordinary skill in the art may make various alterations and changes that do not depart from the spirit and scope of the present invention. Therefore, the scope of protection for the present invention should be that as defined by the claims.

The invention claimed is:

1. A method for calibrating automatic white balance, comprising:
    obtaining a first white point acquired by a device under calibration capturing a neutral color under a calibration light source, and obtaining a second white point acquired by a predetermined golden set capturing a neutral color under the calibration light source, the first white point including a first red deviation value and a first blue deviation value, and the second white point including a second red deviation value and a second blue deviation value, the first red deviation value being a ratio of a red value to a green value acquired by the device under calibration capturing a neutral color, the first blue deviation value being a ratio of a blue value to a green value acquired by the device under calibration capturing a neutral color, the second red deviation value being a ratio of a red value to a green value acquired by the predetermined golden set capturing a neutral color, and the second blue deviation value being a ratio of a blue value to a green value acquired by the predetermined golden set capturing a neutral color;
    if either or both a first difference value between the first red deviation value and second red deviation value is greater than a first predetermined threshold value and a second difference value between the first blue deviation value and second blue deviation value is greater than a second predetermined threshold value, performing one or more of:
    adjusting the second red deviation value so that the first difference value becomes smaller, and
    adjusting the second blue deviation value so that the second difference value becomes smaller; and
    calibrating the device under calibration using one or more of the adjusted second red deviation value and the adjusted second blue deviation value as a first golden value and a second golden value, respectively.

2. The method according to claim 1, wherein all white points acquired by the predetermined golden set capturing a neutral color under different color temperatures are contained in a predetermined white area, and
    wherein the calibrating the device under calibration comprises performing one or more of:
    calculating a ratio of the first golden value to the first red deviation value as a first calibration gain, and using the first calibration gain to shift the first white point so that, on a dimension of red deviation values, a location of the first white point in the predetermined white area and a location of the second white point in the predetermined area are consistent, the predetermined white area having two dimensions including the dimension of red deviation values and a dimension of blue deviation values, and the first white point and the second white point being defined by the dimension of red deviation values and the dimension of blue deviation values; and
    calculating a ratio of the second golden value to the first blue deviation value as a second calibration gain, and using the second calibration gain to shift the first white point so that, on the dimension of blue deviation values, a location of the first white point in the predetermined white area and a location of the second white point in the predetermined area are consistent.

3. The method according to claim 2, further comprising:
    under color temperatures other than the color temperatures of the calibration light source, acquiring a corresponding calibration gain by performing iterative interpolation using one or more of the first calibration gain and the second calibration gain and shifting the first white point along one or more of the dimension of red deviation values and the dimension of blue deviation values.

4. The method according to claim 1, wherein the performing one or more of adjusting the second red deviation value and adjusting the second blue deviation value comprises:
    if the second red deviation value is greater than the first red deviation value, selecting within a predetermined white area a red deviation value that is numerically less than the second red deviation value to be the adjusted second red deviation value;
    if the second red deviation value is less than the first red deviation value, selecting within the predetermined white area a red deviation value that is numerically greater than the second red deviation value to be the adjusted second red deviation value;
    if the second blue deviation value is greater than the first blue deviation value, selecting within the predetermined white area a blue deviation value that is numerically less than the second blue deviation value to be the adjusted second blue deviation value; and
    if the second blue deviation value is less than the first blue deviation value, selecting within the predetermined white area a blue deviation value that is numerically greater than the second blue deviation value to be the adjusted second blue deviation value.

5. The method according to claim 1, wherein the performing one or more of adjusting the second red deviation value and adjusting the second blue deviation value comprises:
when the color temperature of the calibration light source is lower than a predetermined color temperature threshold value, performing one or more of:
adjusting the second red deviation value so that the first difference value becomes smaller, and
adjusting the second blue deviation value so that the second difference value becomes smaller.

6. The method according to claim 1, wherein the first golden value falls in a middle range of the coverage on a dimension of red deviation values of a predetermined white area, and the second golden value falls in a middle range of the coverage on a dimension of blue deviation values of the predetermined white area.

7. An apparatus for calibrating automatic white balance, comprising:
a white point obtaining module to obtain a first white point acquired by a device under calibration capturing a neutral color under a calibration light source, and obtain a second white point acquired by a predetermined golden set capturing a neutral color under the calibration light source, the first white point including a first red deviation value and a first blue deviation value, and the second white point including a second red deviation value and a second blue deviation value, the first red deviation value being a ratio of a red value to a green value acquired by the device under calibration capturing a neutral color, the first blue deviation value being a ratio of a blue value to a green value acquired by the device under calibration capturing a neutral color, the second red deviation value being a ratio of a red value to a green value acquired by the predetermined golden set capturing a neutral color, the second blue deviation value being a ratio of a blue value to a green value acquired by the predetermined golden set capturing a neutral color;
an adjusting module to, when either or both a first difference value between the first red deviation value and second red deviation value is greater than a first predetermined threshold value and a second difference value between the first blue deviation value and second blue deviation value is greater than a second predetermined threshold value, perform one or more of:
adjusting the second red deviation value so that the first difference value becomes smaller, and
adjusting the second blue deviation value so that the second difference value becomes smaller; and
a calibrating module to calibrate the device under calibration using one or more of the adjusted second red deviation value and the adjusted second blue deviation value as a first golden value and a second golden value, respectively.

8. The apparatus according to claim 7, wherein a predetermined white area contains all white points acquired by the predetermined golden set capturing a neutral color under different color temperatures,
wherein the calibrating module comprises:
a first calibrating unit to calculate a ratio of the first golden value to the first red deviation value as a first calibration gain, and use the first calibration gain to shift the first white point so that, on a dimension of red deviation values, a location of the first white point in a predetermined white area and a location of the second white point in the predetermined area are consistent, the predetermined white area having the dimension of red deviation values and a dimension of blue deviation values, and the first white point and the second white point being defined by the dimension of red deviation values and the dimension of blue deviation values; and
a second calibrating unit calculate a ratio of the second golden value to the first blue deviation value as a second calibration gain, and use the second calibration gain to shift the first white point so that, on the dimension of blue deviation values, a location of the first white point in the predetermined white area and a location of the second white point in the predetermined area are consistent.

9. The apparatus according to claim 8, wherein the calibrating module further comprises:
a third calibrating unit to, under a color temperature other than the color temperatures of the calibration light source, acquire a corresponding calibration gain by performing iterative interpolation using one or more of the first calibration gain and the second calibration gain, and shift the first white point along one or more of the dimension of red deviation values and the dimension of blue deviation values.

10. The apparatus according to claim 7, wherein the adjusting module comprises:
a first red deviation value adjusting unit to, when the second red deviation value is greater than the first red deviation value, select within a predetermined white area a red deviation value that is numerically less than the second red deviation value to be the adjusted second red deviation value;
a second red deviation value adjusting unit to, when the second red deviation value is less than the first red deviation value, select within the predetermined white area a red deviation value that is numerically greater than the second red deviation value to be the adjusted second red deviation value;
a first blue deviation value adjusting unit to, when the second blue deviation value is greater than the first blue deviation value, select within the predetermined white area a blue deviation value that is numerically less than the second blue deviation value to be the adjusted second blue deviation value; and
a second blue deviation value adjusting unit to, when the second blue deviation value is less than the first blue deviation value, select within the predetermined white area a blue deviation value that is numerically greater than the second blue deviation value to be the adjusted second blue deviation value.

11. The apparatus according to claim 7, wherein, when the color temperature of the calibration light source is lower than a predetermined color temperature threshold value, the adjusting module performs one or more of:
adjusting the second red deviation value so that the first difference value becomes smaller, and
adjusting the second blue deviation value so that the second difference value becomes smaller.

12. The apparatus according to claim 7, wherein the first golden value falls in a middle range of the coverage on a dimension of red deviation values of a predetermined white area, and the second golden value falls in a middle range of the coverage on a dimension of blue deviation values of the predetermined white area.

13. A non-transitory computer-readable storage medium in which computer instructions are stored, wherein the steps of the method for calibrating automatic white balance according to claim 1 are executed when the computer instructions are executed.

14. A terminal, comprising a storage device and a processor, the storage device storing computer instructions that can be executed on the processor, wherein the steps of the method for calibrating automatic white balance according to claim 1 are executed when the processor executes the computer instructions.

* * * * *